B. Sexton.

Mach. for Stretching & Drying Cloth.

No. 1,050. Reissued Sept. 25, 1860.

N. PETERS, PHOTO-LITHOGRAPHER, WASHINGTON, D. C.

UNITED STATES PATENT OFFICE.

B. SEXTON, OF EAST WINDSOR, CONNECTICUT.

IMPROVEMENT IN MACHINERY FOR DRYING CLOTH.

Specification forming part of Letters Patent No. 28,202, dated May 8, 1860; Reissue No. 1,050, dated September 25, 1860.

*To all whom it may concern:*

Be it known that I, BEZALEEL SEXTON, of East Windsor, in the county of Hartford and State of Connecticut, have invented certain new and useful Improvements in Machinery for Drying Cloth; and I do hereby declare that the following is a full, clear, and exact description thereof, reference being had to the accompanying drawings, making part of this specification, in which—

Figure 1:
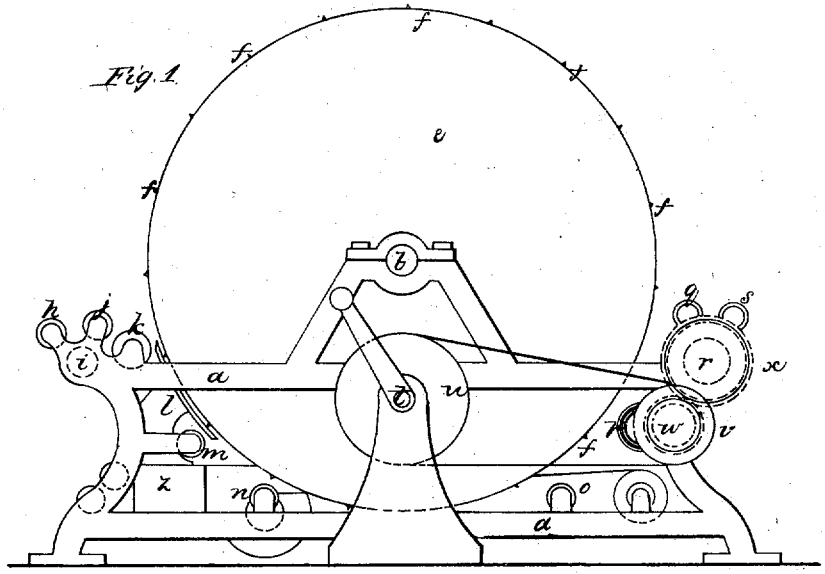
Figure 2:
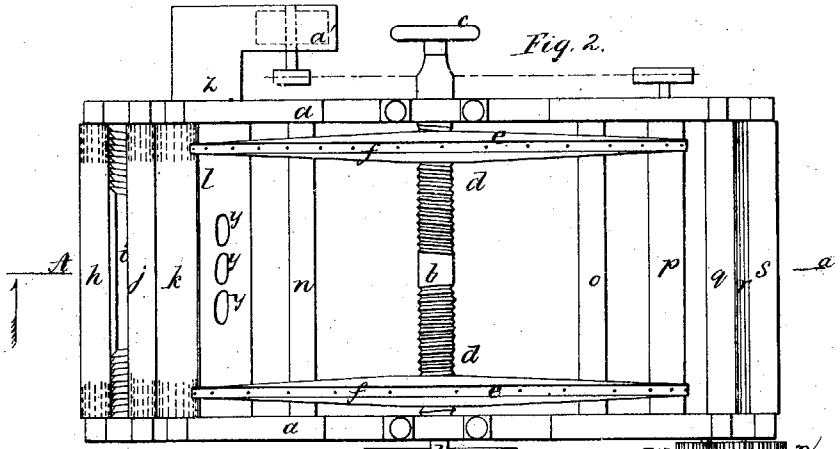
Figures 3, 4:
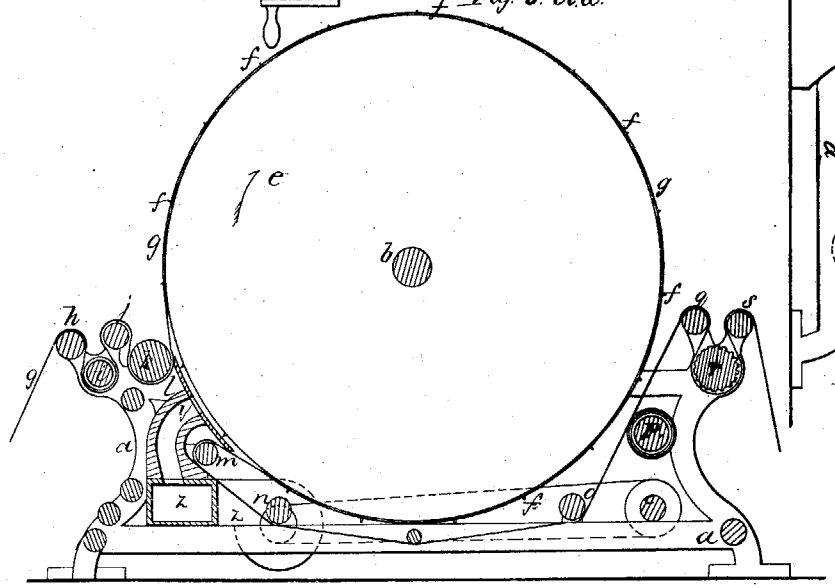

Figure 1 is a side elevation; Fig. 2, a plan or top view, and Fig. 3 a longitudinal vertical section taken at the line A *a* of Fig. 2.

The same letters indicate like parts in all the figures.

My invention relates to an improvement in machinery for drying cloth by currents of air carried against and through the cloth to produce the same effect as if dried in the open air, and thereby avoid the delay, labor, and expense of such mode of drying, and at the same time avoid the bad effects due to drying cloths in contact with heated metal cylinders, as heretofore generally practiced.

In the said machine the cloth to be dried passes over the periphery of two wheels or equivalents armed with suitable tenter-hooks or other equivalent means of holding the two selvages of the cloth and keeping it distended as it travels, to present in succession every part of its surface to the drying influence. The wheels or plates form the ends, and the cloth to be dried the greater part of the periphery of a hollow vessel, leaving a segment through which a current of air is to be introduced to the inside of such hollow vessel to act against the under surface of the cloth, so forming the residue of the periphery, and to pass through its pores when porous to effect the drying.

My said invention consists in combining together the wheels armed with tenter-hooks or their equivalents, and forming the ends of a hollow vessel, the arrangement of rollers or their equivalents for presenting and drawing off the cloth that it may, in passing around the said wheels or their equivalents, form a portion of the outer periphery of the said hollow vessel, and a blowing apparatus or the equivalent thereof outside of the said hollow vessel, and so arranged that the current of air shall enter the said hollow vessel through the segment of the hollow vessel, between the ends thereof and between the place where the wet cloth begins to form part of the periphery of the hollow vessel, and where it is drawn off dry.

In the accompanying drawings, *a* represents a suitable frame, and *b* a horizontal shaft mounted in suitable boxes at the upper part of the frame, and provided at one end with a hand-wheel, *c*, or a crank-handle, by which it can be turned when desired. This shaft is formed, as at *d d*, from each journal toward the middle, with a right and left handed screw, to which are tapped the hubs of two wheels or disks, *e e*, so that by turning the shaft in the wheels or turning the wheels on the shaft the wheels will be drawn closer to each other or separated to suit different widths of cloth, or to stretch the cloth after it has been put onto the wheels, as will be hereinafter described. The two wheels *e e* are provided with tenter-hooks *f f*, projecting from their peripheries and near the inner edges thereof, to catch and hold the edges of the piece of cloth *g* when introduced, and to hold it across the space between them.

The end of the cloth *g*, taken from a roll presented in any suitable manner in front of the machine, is passed over a guide-roller, *h*, and thence passes under a stretching-roller, *i*, formed with a right and left handed thread at the ends to stretch the cloth in the direction of its breadth as it passes through. From this stretching-roller the cloth is carried over another guide-roller, *j*, under another guide-roller, *k*, and thence in front of a guard-plate, *l*, where it is presented to the periphery of the two wheels *e e* and caught and held by the tenter-hooks. The wheels are then turned in the direction of the arrow until the forward end of the cloth reaches the lower edge of the guard-plate *l*, and it is then carried around a guide-roller, *m*, back under a series of guide-rollers, *n o*, by a rapidly-rotating brush, *p*, to and over a guide roller, *q*, thence under a fluted roller, *r*, by which it is pulled through the machine, and thence over another guide-roller, *s*, from which it hangs and drops onto any suitable receptacle.

The fluted roller *r* receives motion from a driving-shaft, *t*, by a train of band and cog wheels, *u v w x* for the purpose of drawing the cloth through the machine at the required speed to effect its drying, and by being thus pulled the cloth imparts motion to the wheels *e e* and to the stretching, and the several guide-rollers, whose journals are mounted to turn freely in suitable boxes, as represented. The rotating brush, if used, can be driven in any suitable manner not necessary to be described. In this way a hollow cylinder with closed ends is formed, the ends by the wheels *e e* and the periphery by the piece of cloth to be dried, except a segment for the introduction of the air, which segment I prefer to close up by the guard-plate *l*. This plate is pierced with numerous holes, *y*, along the middle of its width, which holes communicate with a wind-box, *z*, into which a blast of hot air is forced by a suitable blower, *a'*, to be driven at a high velocity by suitable and well-known means. In this way it will be seen that a blast of heated air is continually blown into the hollow cylinder and through the pores of the cloth, if it be pervious, thereby not only having the effect to dry the cloth by evaporation, but to force the moisture out of the cloth, and at the same time raise the knap on the cloth. And I also avoid an inconvenience heretofore experienced in machinery or apparatus for drying cloth, and that is, that the heated air after taking up moisture by contact with a part of the cloth is not brought in contact with the other parts thereof.

The motion of the cloth can be so regulated relatively to the blast, the condition of the air, and the amount of moisture in the cloth as to insure its being thoroughly dried before it is drawn off. Cloth dried in this way will be found to have all the softness of cloth dried in the open air by the well-known hand process.

When my said invention is to be applied to the drying of cloths or fabrics which are not pervious to air, or which are of such close texture as to prevent the passage of air by the use of a blast, I prefer to leave sufficient space between the cloth and the periphery of the wheels *e e* for the escape of air from the inside of the cylinder. And although I have herein described the use of a blast of heated air and the production of the required current by a forcing blower, I do not wish to be understood as limiting myself thereto, as atmospheric air, without being artificially heated, may be used, and in some instances it may be desired to use other gases. And instead of blowing a blast of air within the cylinder a like result may be obtained by incasing the apparatus and exhausting the air therefrom that the current may be induced by the pressure of the atmosphere. And although I have above described the use of two wheels as a means of forming a hollow space surrounded by the cloth to be dried, and deem that the best mode of applying the principle of my said invention, nevertheless I do not wish to be confined thereto, as other and equivalent modes of application may be substituted, such as two endless chains or bands traveling on, or at, or near, the edges of two end plates, the said chains or bands being provided with tenter-hooks or other suitable means for holding the selvages or edges of the cloth; or the end plates may be so formed or provided with suitable means for holding the edges or selvages of the cloth as to allow the cloth to move thereon or therein, and although these and other modifications may be made, I prefer the mode of application which I have adopted and above specifically described.

I do not claim as my invention the drying of cloth by machinery which forces a blast or current of air against and through the pores thereof.

What I do claim as my invention, and desire to secure by Letters Patent, is—

Combining with the wheels armed with tenter-hooks substantially as described, the arrangement of rollers, or equivalent thereof, for presenting and drawing off the cloth, so that it shall form part of the periphery of a hollow vessel, substantially as described, and an apparatus substantially as described for introducing a blast of air through the segment of the periphery of the said hollow vessel, between the end wheels, and between the place where the wet cloth begins to form the periphery of the said hollow vessel, and where the dry cloth is drawn off, substantially as and for the purpose specified.

B. SEXTON.

Witnesses:
HENRY PEAREDE,
E. H. WOODWARD.